US006969282B2

(12) United States Patent
Liu

(10) Patent No.: US 6,969,282 B2
(45) Date of Patent: Nov. 29, 2005

(54) SIM CARD RETAINER

(75) Inventor: Yu-Chen Liu, Taichung (TW)

(73) Assignee: BenQ Corporation, Taoyuan Shien (TW)

( * ) Notice: Subject to any disclaimer, the term of this patent is extended or adjusted under 35 U.S.C. 154(b) by 0 days.

(21) Appl. No.: 10/986,872

(22) Filed: Nov. 15, 2004

(65) Prior Publication Data

US 2005/0106925 A1 May 19, 2005

(30) Foreign Application Priority Data

Nov. 19, 2003 (TW) .............................. 92132472 A

(51) Int. Cl.[7] ........................................... H01R 24/00
(52) U.S. Cl. ...................... 439/630; 439/327; 455/558; 235/441
(58) Field of Search ............................ 439/630–632, 439/325–327; 455/558; 235/441

(56) References Cited

U.S. PATENT DOCUMENTS

| 5,257,414 | A | * | 10/1993 | Trahan et al. ............... 455/558 |
| 5,336,877 | A | * | 8/1994 | Raab et al. .................. 235/475 |
| 5,894,597 | A | * | 4/1999 | Schwartz et al. ........... 455/558 |
| 6,468,101 | B2 | * | 10/2002 | Suzuki ....................... 439/326 |
| 6,761,591 | B1 | * | 7/2004 | Zhou .......................... 439/630 |
| 6,766,952 | B2 | * | 7/2004 | Luu ........................... 235/451 |

* cited by examiner

Primary Examiner—Truc Nguyen
(74) Attorney, Agent, or Firm—Rabin & Berdo, PC

(57) ABSTRACT

A SIM card retainer includes an installing base and a locking device. The installing base has a receiving space, which exposes a SIM card connector and is used for receiving the SIM card. The locking device has a fixing portion, a force-applying portion and a deformable portion. The locking device is disposed on the installing base so that the SIM card is fixed within the receiving space by the fixing portion and electrically connected to a SIM card connector. Applying a force on the force-applying portion, the deformable portion will deform elastically and the fixing portion will withdraw from the receiving space, so that the SIM card can be loaded into or unloaded from the installing base. The SIM card is fixed by removing the applying force from the force-applying portion to recover the original shape of the deformable portion and to return the fixing portion.

12 Claims, 8 Drawing Sheets

SIM CARD RETAINER

This application claims the benefit of Taiwan application Serial No. 92132472, filed Nov. 19, 2003, the subject matter of which is incorporated herein by reference.

BACKGROUND OF THE INVENTION

1. Field of the Invention

The invention relates in general to a SIM card retainer applied in a mobile phone, and more particularly to a retainer which retains a SIM card by means of elasticity deformation of a deformable device.

2. Description of the Related Art

Along with the rapid advance in the electronic industry and the continual renewal in technology, new communication products are brought forth to the market one after another. In recent years, the mobile phone, with its diversified functions, has become a necessity to modern people in their daily lives. Subscriber identification module card (SIM card), the heart of a mobile phone, is a plastic card mounted by an IC chip for recording the information and identification of a mobile phone number and for providing call register of call costing.

Referring to FIG. 1, a diagram of a conventional SIM card retainer is shown. The SIM card retainer, which is disposed within a mobile phone for fixing the SIM card so that the SIM card can be electrically connected to a SIM card connector 10, mainly includes an installing base 12 and a locking device 14.

The installing base 12 has a receiving space 121. The receiving space 121 exposes the SIM card connector 10 and sets the SIM card (not shown in the diagram). The locking device 14 is disposed on the installing base 12 and may move back and forth along the direction of an arrow shown in the diagram.

When loading the SIM card 16 into the receiving space 121, the user may push the locking device 14 to withdraw the locking device 14 from the receiving space 121. After that, the user may load the SIM card 16 into the receiving space 121, as shown in FIG. 2A.

FIG. 2A is a diagram of fixing the SIM card within a receiving space. Referring to FIG. 2B, a diagram of fixing the SIM card within the receiving space by means of a locking device is shown. In order to have the SIM card 16 be electrically connected to the SIM card connector 10, the locking device 14 is pushed to move forward in a direction opposite to that in FIG. 2A. After that, the locking device 14 locks and fixes the SIM card 16 within the receiving space 121 of the installing base 12 in FIG. 1.

It can be understood from the above disclosure that in order to load the SIM card 16 into the receiving space 121 or to unload the SIM card 16 from the receiving space 121, the user may push the locking device 14 to withdraw the locking device 14 from the receiving space 121 so that the SIM card 16 can be loaded into or unloaded from the installing base 12.

After loading the SIM card 16 into the receiving space 121, the locking device 14 must return to be above the receiving space 121 in order to fix the SIM card within the receiving space 121.

The locking device 14 of the above familiar SIM card retainer, when pushed, may easily move back and forth on the installing base 12. So, if a mobile phone is dropped to the ground, the external force will easily move the locking device 14 to withdraw from the receiving space 121, making the SIM card 16 fail to be electrically connected to the SIM card connector 10 effectively or even causing the SIM card 16 to be disconnected from the receiving space 121, severely reducing the availability of the mobile phone.

SUMMARY OF THE INVENTION

It is therefore an object of the invention to provide a SIM card retainer to fix the SIM card within a mobile phone firmly and equip the mobile phone with better availability.

The invention achieves the above-identified object by providing a SIM card retainer used for being incorporated with a SIM card connector disposed within a mobile phone. The SIM card retainer mainly includes an installing base and a locking device. The installing base has a receiving space, which exposes a SIM card connector and is used for receiving the SIM card. The locking device has a fixing portion, a force-applying portion and a deformable portion. The locking device is disposed on the installing base and the fixing portion is opposite to the receiving space so that the SIM card is fixed within the receiving space by the fixing portion and electrically connected to a SIM card connector. The SIM card is loaded into or unloaded from the installing base by applying a force on the force-applying portion to elastically deform the deformable portion and to withdraw the fixing portion from the receiving space. On the other hand, the SIM card is locked by removing the applying force from the force-applying portion to recover an original shape of the deformable portion and to return the fixing portion to project over the receiving space.

The installing base of the above SIM card retainer may further have an opening while the locking device may further have a junction portion which touches two lateral sides of the opening so that the locking device is disposed on the installing base. Moreover, the installing base further has a rib disposed on the bottom of the installing base and juxtaposed with a lateral side of the receiving space, for pre-pushing the SIM card so that the SIM card is more firmly locked and fixed within the receiving space by the locking device. Furthermore, the fixing portion of the SIM card retainer further have a protrusion disposed thereon, while the mobile phone may have a battery disposed on the fixing portion to touch the protrusion so that the fixing portion presses the SIM card tightly. In addition, the installing base of the above SIM card retainer is formed on the mobile phone or may be made of plastics in a monolithic piece while the locking device is made of metal in a monolithic piece.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention is disclosed by way of a preferred embodiment. However, the scope of protection of the invention is not limited thereto. The preferred embodiment of the invention is a SIM card retainer according to the spirit of the invention. The technical characteristics of the invention are disclosed below.

Figure 1:
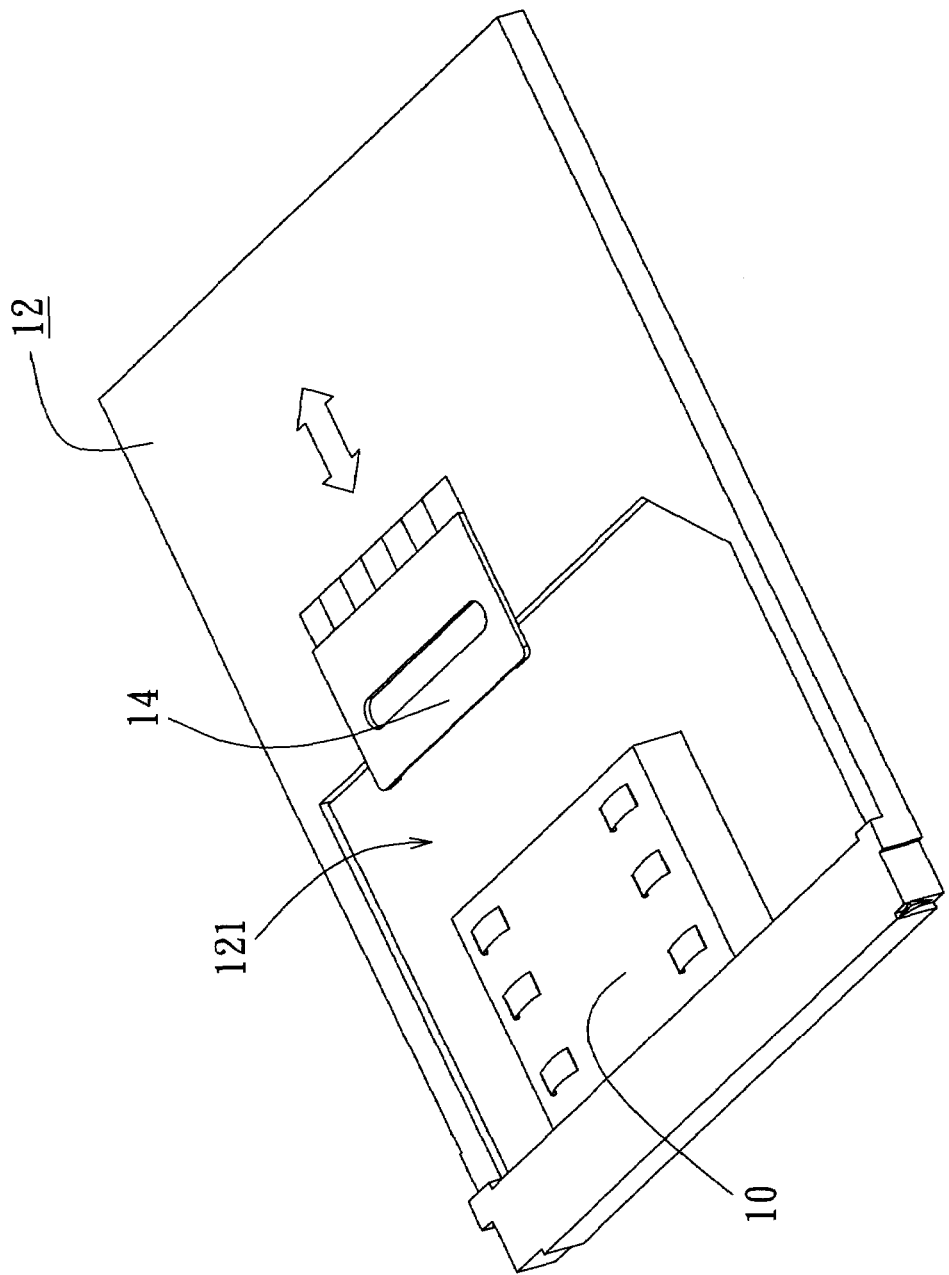
FIG. 1 is a diagram of a conventional SIM card retainer.
Figure 2B:
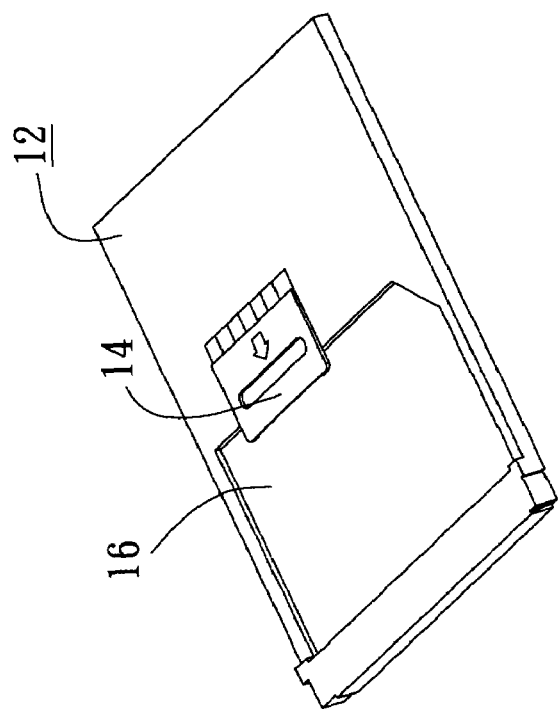
FIG. 2B is a diagram of fixing the SIM card within a receiving space by a locking device.
Figure 2A:
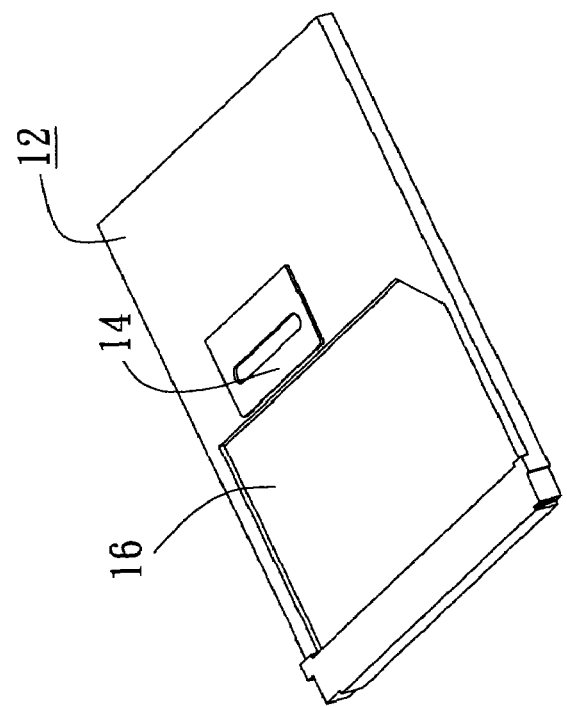
FIG. 2A is a diagram of fixing the SIM card within a receiving space.
Figure 3:
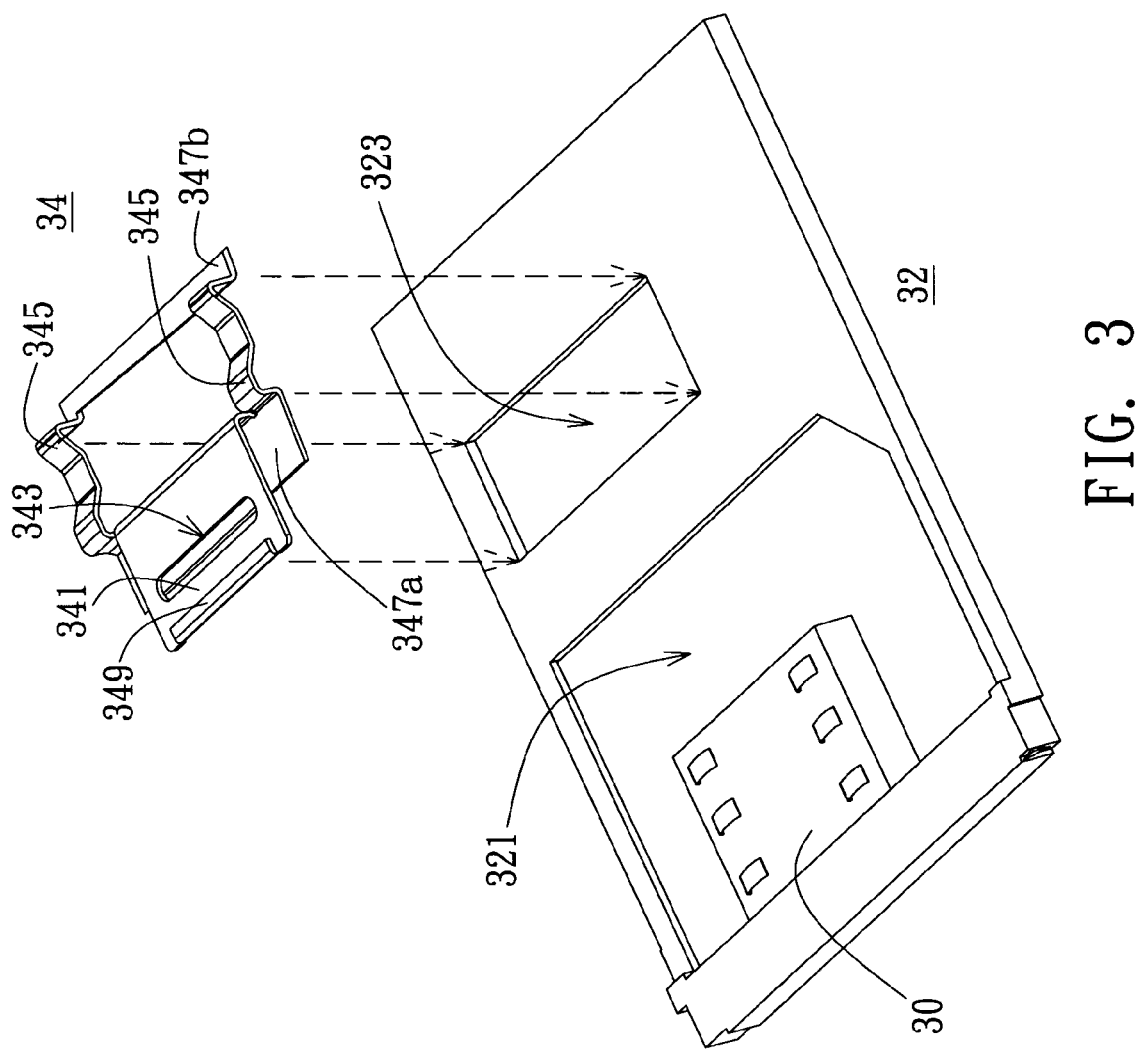
FIG. 3 is an exploded view of a SIM retainer according to the preferred embodiment of the invention.
Figure 4:
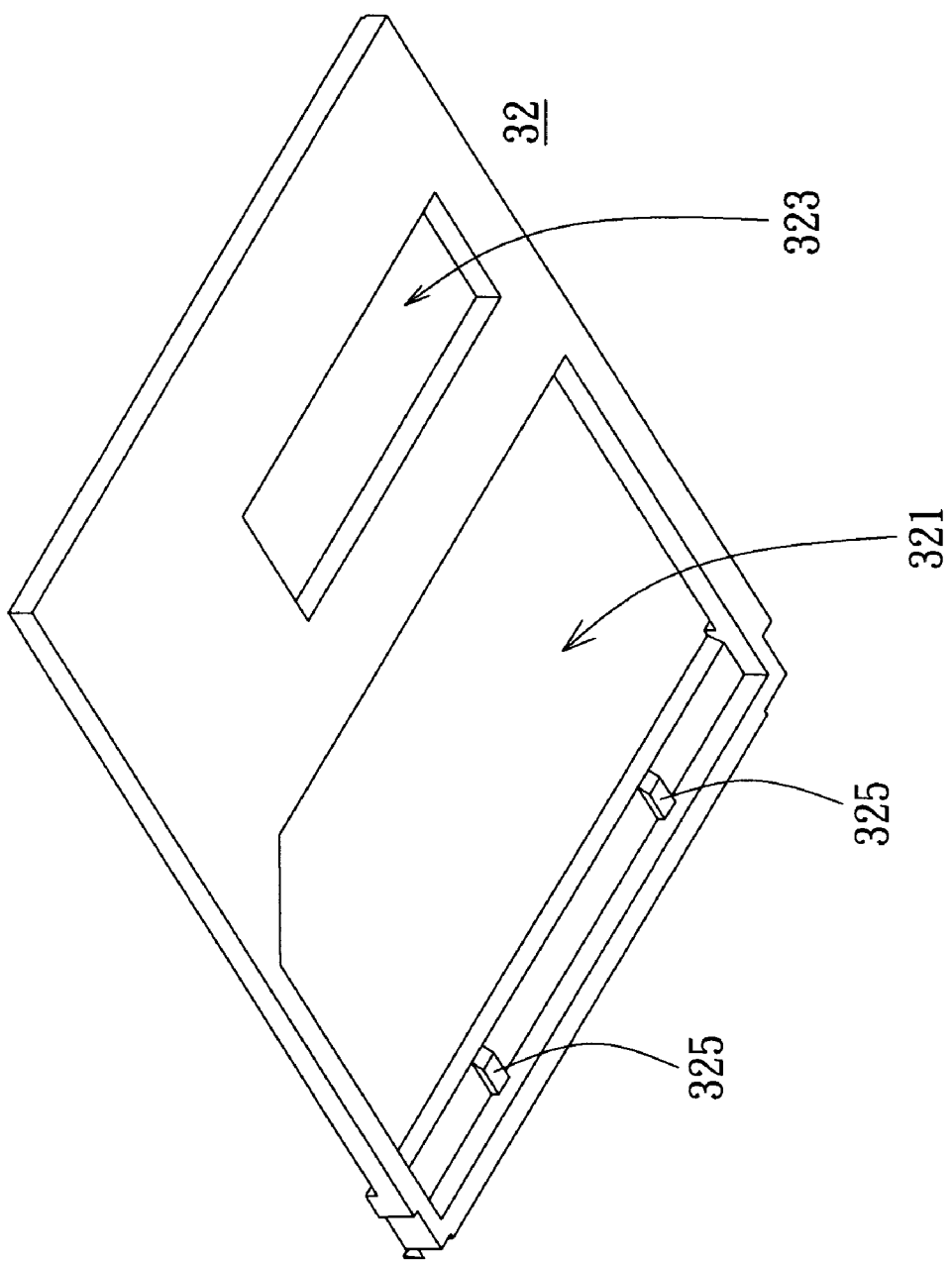
FIG. 4 is a diagram of the bottom of the installing base of the SIM card retainer.

Referring to both FIG. 3 and FIG. 4, an exploded view of a SIM retainer according to the preferred embodiment of the invention and a diagram of the bottom of the installing base of the SIM card retainer are shown. The SIM card retainer is incorporated with a SIM card connector disposed within a mobile phone. The SIM card retainer according to the invention mainly includes an installing base 32 and a locking device 34.

The installing base 32, which is disposed within a mobile phone, has a receiving space 321 and an opening 323, wherein a rib 325 is disposed on the lateral side of the receiving space 321 disposed the bottom of the installing base 32. The receiving space 321, which exposes a SIM card connector 30 disposed on the mobile phone, is used for receiving the SIM card (not shown in the diagram) so that the SIM card will be confined at the receiving space 321.

As shown in FIG. 3, the locking device 34 has a fixing portion 341, a force-applying portion 343, a deformable portion 345, and a junction portion 347a and 347b.

Figure 5:
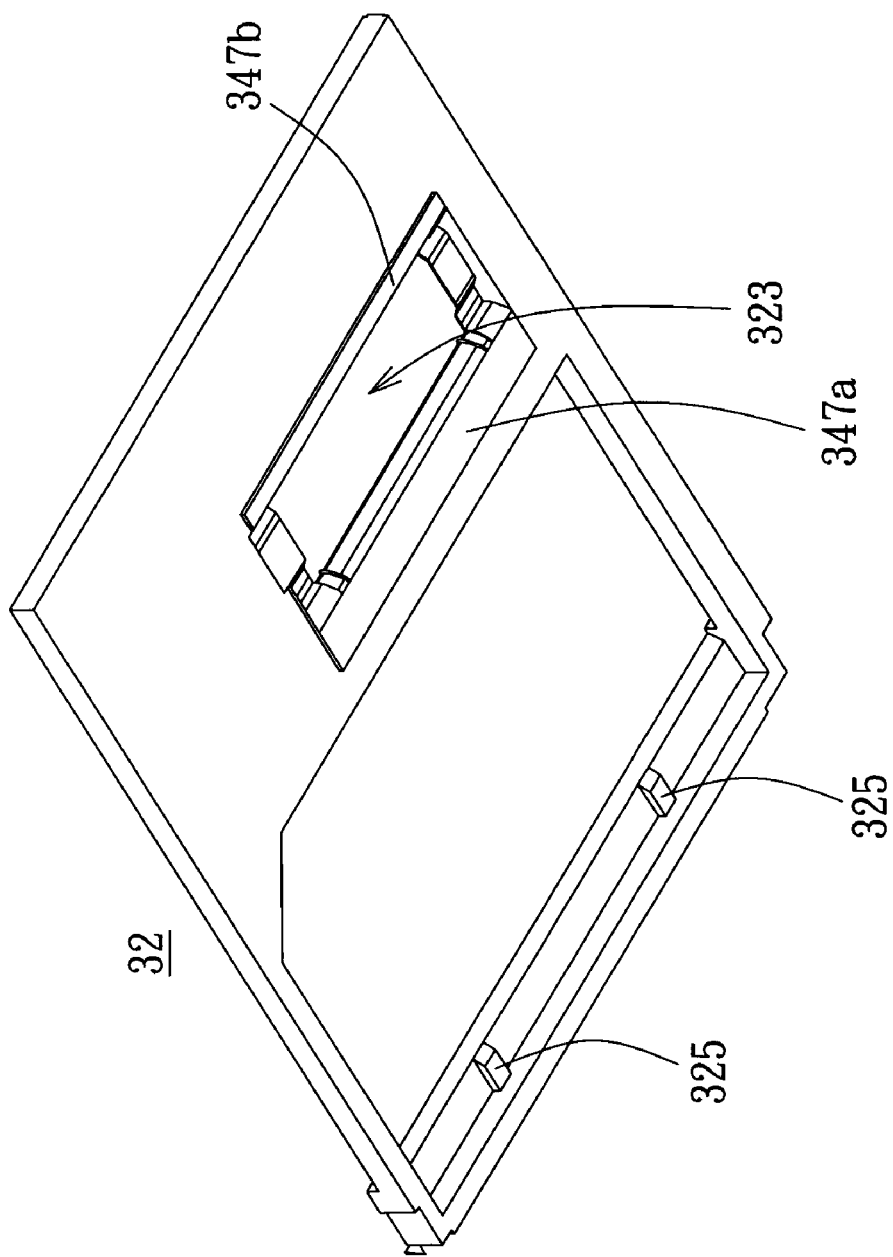
FIG. 5 is a diagram of the bottom of the installing base of an assembled SIM card retainer.

Referring to FIG. 5, a diagram of the bottom of the installing base of an assembled SIM card retainer is shown. First of all, an external force is applied to pre-press the junction portion 347a and 347b into the opening 323. By way of removing the external force when the junction portion 347a and 347b are set at the opening, the junction portion 347a and 347b will extend outwardly to touch and push two inner lateral sides of the opening 323 so that the locking device may be disposed on the installing base 32. Besides, the rib 325 is used to pre-push the SIM card.

Figure 6:
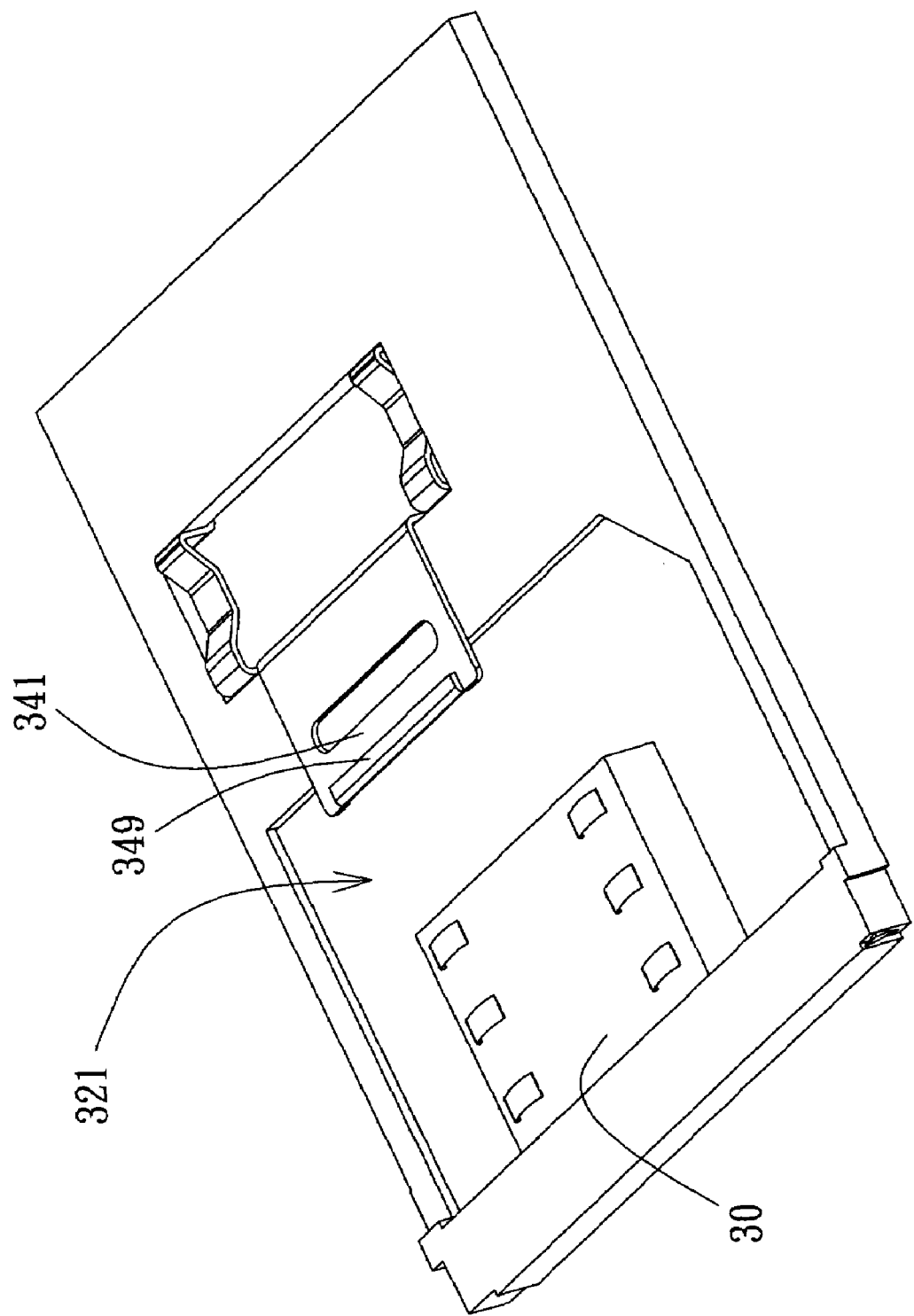
FIG. 6 is a diagram of the assembled SIM card retainer.

Referring to FIG. 6, a diagram of the assembled SIM card retainer is shown. The assembled SIM card retainer, which corresponds to the SIM card connector 30, makes the fixing portion 341 to be opposite to the receiving space 321. The fixing portion 341 is for locking and fixing the SIM card within the receiving space 321 so that the SIM card may be electrically connected to the SIM card retainer 30. Moreover, the rib 325 (shown in FIG. 5) may be used to pre-push the SIM card (not shown in the diagram). Both the fixing portion 341 and the rib 325 may restrict the movement perpendicular to the plane of the SIM card so that the SIM card may be firmly fixed within the receiving space 321 and electrically connected to the SIM card connector 30 in a stable condition.

Figure 7B:
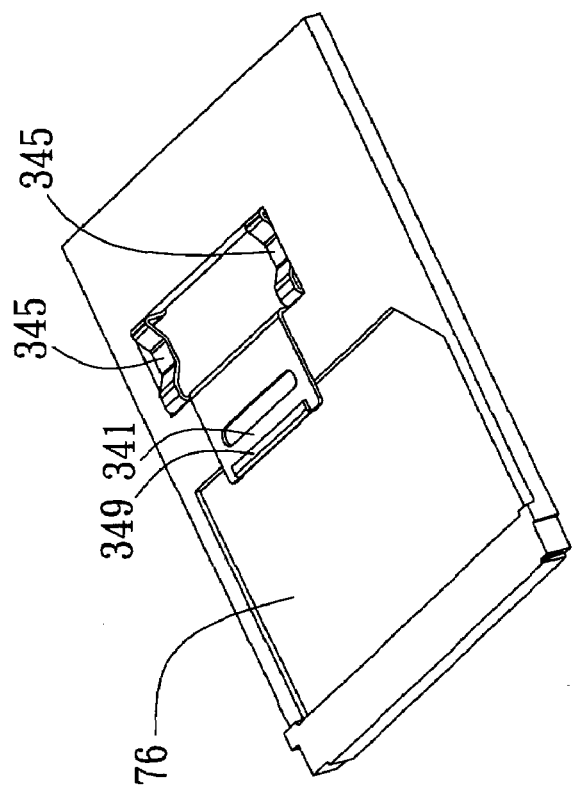
FIG. 7B is a diagram of returning the fixing portion back to project over the receiving space.
Figure 7A:
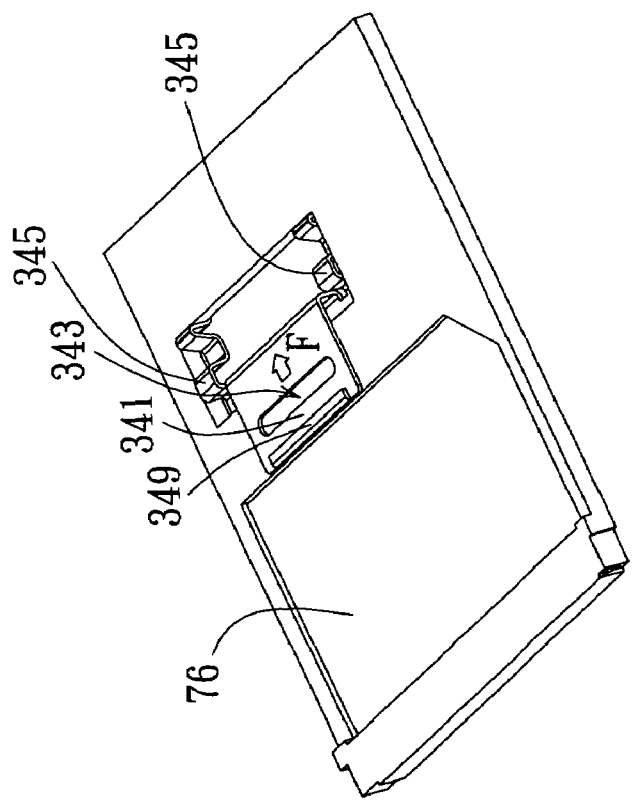
FIG. 7A is a diagram of withdrawing the fixing portion from the receiving space.

Referring to FIG. 7A, a diagram of withdrawing the fixing portion from the receiving space is shown. The SIM card 76 can be unloaded from the mobile phone by way of providing a force F on the force-applying portion 343, so that the deformable portion 345 will deform elastically and that the fixing portion 341 will move backward and withdraw from the receiving space 321.

Referring to FIG. 7B, a diagram of returning the fixing portion back to project over the receiving space is shown.

The SIM card 76 can be fixed and locked by way of unloading the applying force F from the force-applying portion, so that the deformable portion 345 will recover its original shape and that the fixing portion 341 will return back and project over the receiving space 321.

Figure 8:
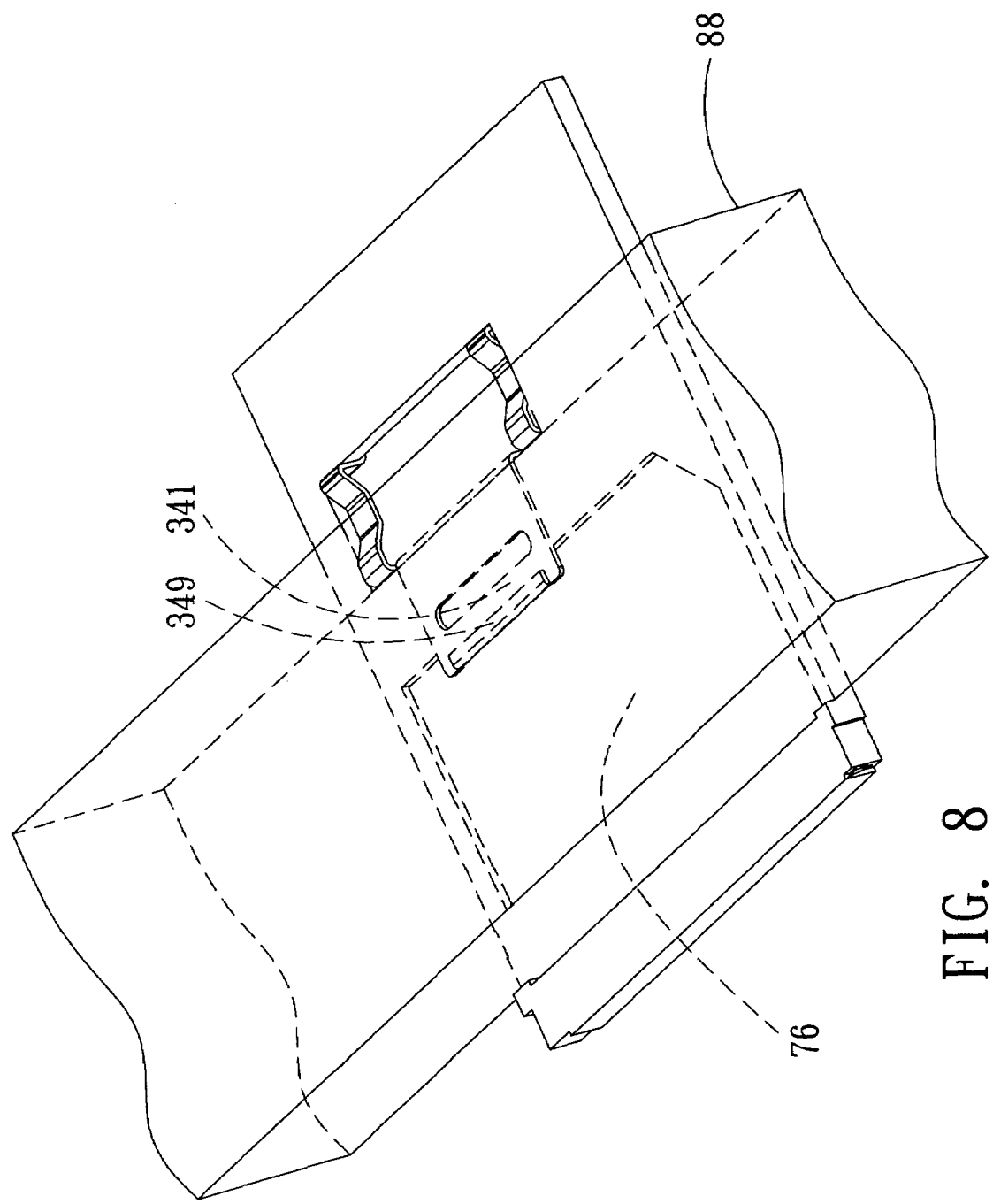
FIG. 8 is a diagram of the parts in relation to a protrusion.

In the above preferred embodiment, the fixing portion may further have a protrusion 349 disposed thereon; while the mobile phone may have a parts 88, a battery for instance, disposed on the fixing portion to touch the protrusion 349, so that the fixing portion 341 may press the SIM card 76 tightly, making the SIM card 76 electrically connected to the SIM card connector 30 in a stable condition as shown in FIG. 8.

Moreover, the installing base 32 may be made of plastics in a monolithic piece. The installing base 32 may be formed on the mobile phone, i.e., the installing base 32 and the body of the mobile phone are formed together in a singly piece. The locking device 76 may be made of metal in a monolithic piece.

The force-applying portion 343 of the locking device 34 is not limited to an indentation. The shape of the force-applying portion 343 is not defined. Any structure or protrusion facilitating the applying of force may be disposed on the locking device 34 of the invention and serve as a force-applying portion thereof. Besides, the deformable portion 345 does not need to be a bendable structure in order to deform elastically.

The function of the deformable portion 345 is like an elastically deformable spring. Therefore, any structure capable of being elastically deformed may be used as a deformable portion of the locking device 34 according to the invention. The shape of the protrusion 349 is not defined either. Any protrusion protruding from the fixing portion 341 and may be easily touched by the parts 88 tightly will do. The spring constant of the deformable portion 345 depends on the material and geometric shape of the deformable portion 345. Therefore a deformable portion 345 made of appropriate material with good geometric design certainly helps the locking device 34 to lock and fix the SIM card 76 more firmly.

Besides, the SIM card retainer according to the invention makes the planar movement of the SIM card 76 to be restricted by the receiving space 321 of the installing base 32. As for the movement perpendicular to the plane of the SIM card, the SIM card 76 is restricted by the rib 325 of the installing base 32 and the fixing portion 341 of the locking device 34, so that the SIM card 76 may remain to be pre-pressed and electrically connected to the SIM card connector 30.

It can be understood from the above disclosure that the SIM card retainer according to the invention is a normally closed SIM card retainer, which means the locking device 34 is normally locked in a natural status. So the user must apply a strong enough force F on the force-applying portion 343 of the locking device 34 in order to elastically deform the deformable portion 345, so that the fixing portion 341 will withdraw from the receiving space 321, enabling the SIM card 76 to be unloaded from the receiving space 321.

When a mobile phone receives a colliding force, for instance if the mobile phone drops to the ground, the fixing portion 341 will not withdraw from the receiving space 321. The most prominent advantage of the SIM card retainer according to the invention is that despite the mobile phone drops to the ground, such an external force is still unable to move the locking device 34 backward from the receiving space 321, hence the SIM card 76 may remain firmly fixed within the receiving space 321. As a result, the SIM card 76 may continue to be electrically connected to the SIM card connector, assuring an excellent availability of the mobile phone.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A SIM card retainer used for being incorporated with a SIM card connector of a mobile phone, the SIM card retainer comprising:
   an installing base disposed within the mobile phone and having a receiving space, the receiving space exposing the SIM card connector and being used for receiving a SIM card; and
   a locking device including a fixing portion, a force-applying portion and a deformable portion, wherein the locking device is disposed on the installing base and the fixing portion is opposite to the receiving space so that the SIM card is fixed within the receiving space by the fixing portion and electrically connected to the SIM card connector;
   wherein the SIM card is loaded into or unloaded from the installing base by applying a force on the force-applying portion to elastically deform the deformable portion and to withdraw the fixing portion from the receiving space, and wherein the SIM card is locked in the installing base by removing the applying force from the force-applying portion to recover an original shape of the deformable portion and to return the fixing portion to project over the receiving space.

2. The SIM card retainer according to claim 1, wherein the installing base further has an opening while the locking device further has a junction portion for touching two lateral sides of the opening so that the locking device is disposed on the installing base.

3. The SIM card retainer according to claim 1, wherein the installing base further has a rib disposed on the bottom of the installing base and juxtaposed with a lateral side of the receiving space, for pre-pushing the SIM card, so that the SIM card is firmly locked and fixed within the receiving space by the locking device.

4. The SIM card retainer according to claim 1, wherein the fixing portion of the SIM card retainer further has a protrusion disposed thereon, while the mobile phone has a battery disposed on the fixing portion to touch the protrusion so that the fixing portion presses the SIM card tightly.

5. The SIM card retainer according to claim 1, wherein the installing base of the SIM card retainer is made of plastics in a monolithic piece.

6. The SIM card retainer according to claim 1, wherein the installing base is formed on the mobile phone.

7. The SIM card retainer according to claim 1, wherein the locking device is made of metal in a monolithic piece.

8. A SIM card retainer used for being incorporated with a SIM card connector of a mobile phone, comprising:
   an installing base disposed within a mobile phone and having a receiving space, an opening, and a rib, wherein the rib is disposed on the bottom of the installing base and juxtaposed with a lateral side of the receiving space, and the receiving space, which exposes the SIM card connector disposed on the mobile phone, is used for receiving a SIM card; and
   a locking device including a fixing portion, a force-applying portion, a deformable portion, and a junction portion, wherein the junction portion touches two lateral sides of the opening so that the locking device is disposed on the installing base, the fixing portion is opposite to the receiving space, and the rib is for pre-pressing the SIM card so that the SIM card is fixed within the receiving space firmly by the fixing portion and electrically connected to the SIM card connector;
   wherein the SIM card is loaded into or unloaded from the installing base by applying a force on the force-applying portion to elastically deform the deformable portion and to withdraw the fixing portion from the receiving space, and wherein the SIM card is locked in the installing base by removing the applying force from the force-applying portion to recover an original shape of the deformable portion and to return the fixing portion to project over the receiving space.

9. The SIM card retainer according to claim 8, wherein the fixing portion further has a protrusion disposed thereon, while the mobile phone has a battery disposed on the fixing portion to touch the protrusion, so that the fixing portion presses the SIM card tightly.

10. The SIM card retainer according to claim 8, wherein the installing base of the SIM card retainer is made of plastics in a monolithic piece.

11. The SIM card retainer according to claim 8, wherein the installing base is formed on the mobile phone.

12. The SIM card retainer according to claim 8, wherein the locking device is made of metal in a monolithic piece.

* * * * *